INVENTOR.
ALDEN H. JACOBSON
BY
Norman S. Blodgett
ATTORNEY

United States Patent Office 3,530,744
Patented Sept. 29, 1970

3,530,744
MACHINE TOOL
Alden H. Jacobson, Princeton, Mass., assignor to The Heald Machine Company, Worcester, Mass., a corporation of Delaware
Filed Mar. 18, 1968, Ser. No. 713,568
Int. Cl. B23b 29/04
U.S. Cl. 77—57                                                7 Claims

ABSTRACT OF THE DISCLOSURE

Apparatus for generating surfaces of revolution, such as grooves, in bores of limited diameter, consisting of a rotatable bar on which tools are mounted, the axis of rotation of the bar being movable laterally after the bar and tools have been inserted in the bore.

BACKGROUND OF THE INVENTION

There are many machining operations in which a boring bar or the like must be introduced into a bore which is only slightly larger than the boring bar itself and then to cut grooves in the walls of the bore. Particularly in those situations where the bore is small in diameter, it is necessary that the boring bar be as large as possible to prevent chatter, poor finish, poor geometry and poor size. In the case of very long bores, it is desirable also to support the outer end of the boring bar. Apparatus that have been provided in the past for performing similar machining operations have been expensive and complicated and have not been entirely capable of performing the function. In those cases, for instance, where a plurality of grooves are to be formed in a long bore, it has sometimes been necessary to machine each groove separately. These and other difficulties experienced with the prior art devices have been obviated in a novel manner by the present invention.

It is, therefore, an outstanding object of the invention to provide a machine tool for forming grooves or the like in bores.

Another object of this invention is the provision of a machine tool for forming a plurality of grooves at the same time in an elongated bore.

A further object of the present invention is the provision of a groove cutter which is simple in construction, inexpensive to manufacture, and which is capable of a long life of useful service with a minimum of maintenance.

It is another object of the instant invention to provide a boring machine for use with elongated bores where the outboard end of the boring bar is supported.

A still further object of the invention is the provision of a boring bar having a grooving tool which is retracted when introduced into the bore and which can be extended into operative position when desired and wherein means is provided to assure that the tool is retracted during its entrance and removal from the bore and to assure that it is in extended position when the grooving operation is to be performed.

With these and other objects in view, as will be apparent to those skilled in the art, the invention resides in the combination of parts set forth in the specification and covered by the claims appended hereto.

SUMMARY OF THE INVENTION

In general, the present invention involves a machine tool having a base, a sleeve with an outer cylindrical surface mounted for rotation relative to the base about the axis of the surface, the sleeve having a cylindrical bore whose axis is spaced from and parallel to the said axis of the surface, a bar mounted in the bore of the sleeve having a radially-extending tool mounted on a portion of the bar outside of the bore, and a means for rotating the sleeve and the bar together about the axis of the surface. Furthermore, means is provided for rotating the bar relative to the sleeve about the bore axis to move the tool from an inoperative position to an operative position.

More specifically, the bar is connected to an indicator member through a long-lead thread arrangement; the bar and the indicator member normally rotate together due to the action of the drive means, the second drive means being operative only on the bar, so that the differential rotation produces longitudinal movement of the indicator member relative to the bar.

BRIEF DESCRIPTION OF THE DRAWINGS

The character of the invention, however, may be best understood by reference to one of its structural forms, as illustrated by the accompanying drawings, in which.

Figure 1:
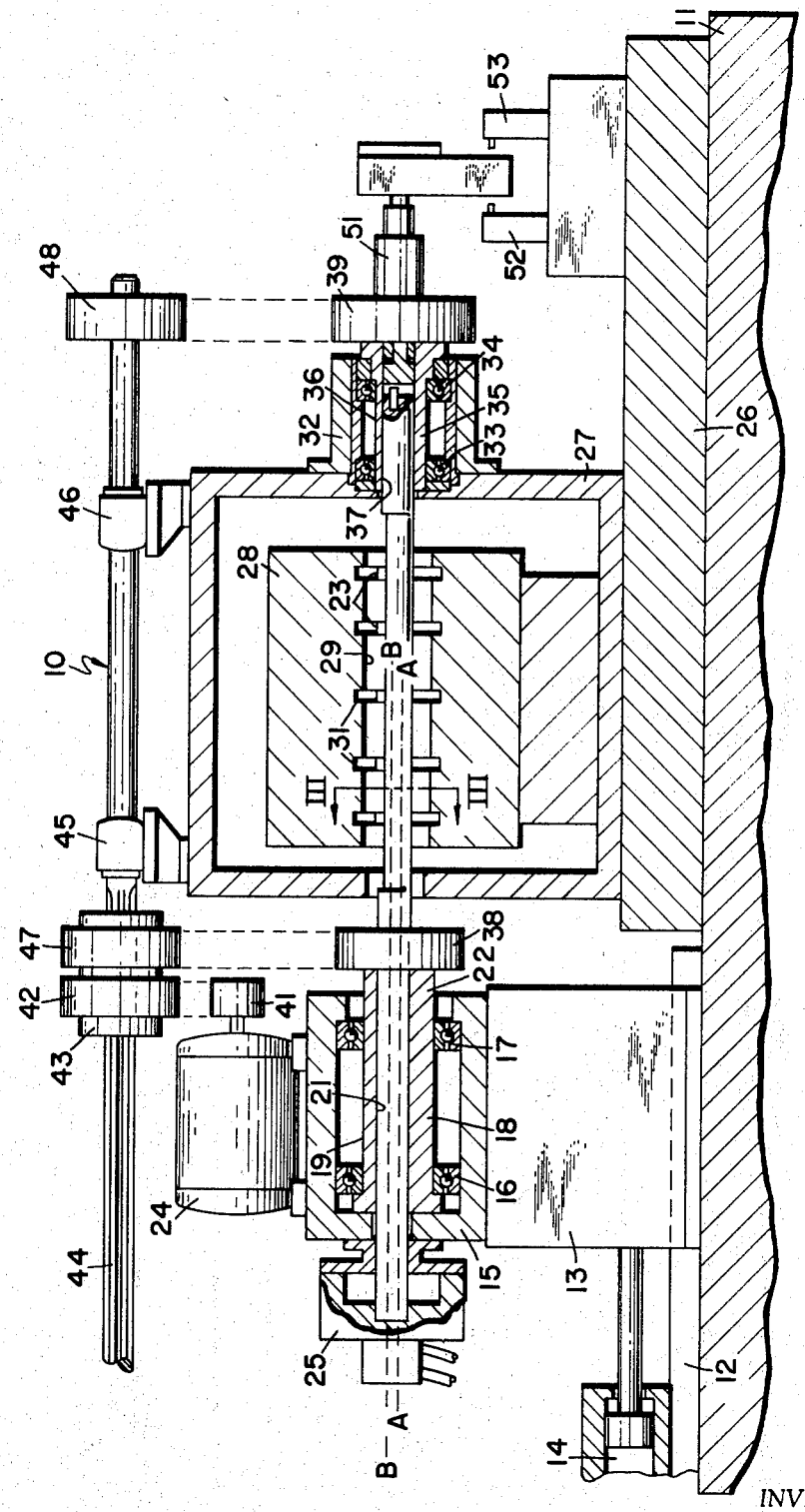
FIG. 1 is a vertical sectional view of a machine tool embodying the principles of the present invention.

Referring first to FIG. 1, which best shows the general features of the invention, the machine tool, indicated generally by the reference numeral 10, is shown as having a base 11 having ways 12 on which is slidably mounted a table 13 which is movable along the ways by a hydraulic cylinder 14. On top of the table 13 is carried a housing 15 having two spaced coaxial ball bearings 16 and 17 in which is rotatably carried a sleeve 18. This sleeve is provided with an outer cylindrical surface 19 which is carried in the bearings 16 and 17 for rotation about its axis indicated on the drawing by the line A—A. The sleeve 18 is provided with a bore 21 whose axis is spaced from and parallel to the axis A—A of the surface 19. A boring bar 22 is carried in the bore of the sleeve and has radially-extending tools 23 mounted on a portion of the bar lying outside of the bore 21.

A thrust means, such as an electric motor 24, is mounted on the upper surface of the housing 15 for rotating the sleeve 18 and the bar 22 together about the axis A—A of the surface 19. Mounted on the outside surface of the housing 15 is a second means, such as a hydraulic vane-type motor 25 whose axis is the axis B—B of the bar, for rotating the bar 22 relative to the sleeve 18 about the bore axis B—B to move the tool 23 from an inoperative position to an operative position.

Mounted on the base 11 is a fixed platform 26 on which is mounted a box-like housing 27 in the interior of which is mounted a workpiece 28. The workpiece has a bore 29 in which are to be machined grooves 31. Mounted on the side of the housing 27 opposite the side facing toward the housing 15 is a hub 32 carrying two spaced ball bearings 33 and 34 in which are mounted for rotation a sleeve 35. This sleeve has an outer cylindrical surface 36 with which the bearings cooperate to rotate the sleeve on the axis of the surface 36, which axis is the same as the axis of the sleeve 18; that is to say, the axis A—A. Similarly, the sleeve 35 is provided with a bore 37 in which is carried the outboard end of the boring bar 22. The axis of the bore 37 is coaxial with the axis of the bore 21 in the sleeve 18.

Figure 3:
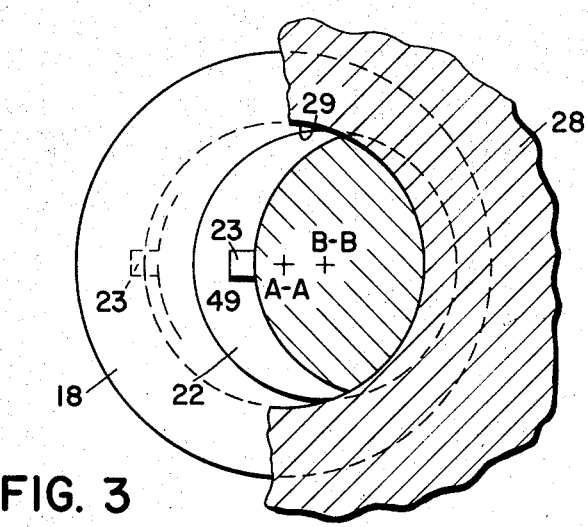
FIG. 3 is an enlarged diagrammatic view of a section of the machine taken on the line III—III of FIG. 1, showing the geometric inter-relationship of the parts.

Mounted on the sleeve 18 is a pulley 38, while a similar pulley 39 is fastened to the sleeve 35. The motor 24 is provided with a pulley 41 which operates through a timing belt to drive a pulley 42 which is mounted on a hub 43 which is keyed to and slidable longitudinally along a splined shaft 44. The shaft 44 is mounted in bearings 45 and 46 mounted on the upper surface of the housing 27 and is driven, therefore, by the motor 24. Also mounted on the hub 43 is a pulley 47 which rotates with the pulley 42 and the shaft 44 and is connected by a timing belt to the pulley 38 to drive the sleeve 18. At the other end of the shaft 44 is provided with a pulley 48 which is connected by a timing belt to the pulley 39 so that the motor 24 not only drives the sleeve 18 but also the sleeve 35 and it drives them both at the same speed and with their bores 21 and 37 always in coaxial relationship. The tools 23 are mounted at a portion of the bar 22 lying between the sleeves 18 and 35 and they are located in the bar in an indentation 49 (see particularly FIG. 3), so that none of the tools 23 extend radially otuwardly of the imaginary extension of the normal cylindrical surface of the bar over the indentation.

Fastened to the pulley 39 and the sleeve 35 is an indicator means 51 which is movable back and forth between two limit switches 52 and 53 to indicate either the operative or the inoperative position of the tools 23.

Figure 2:
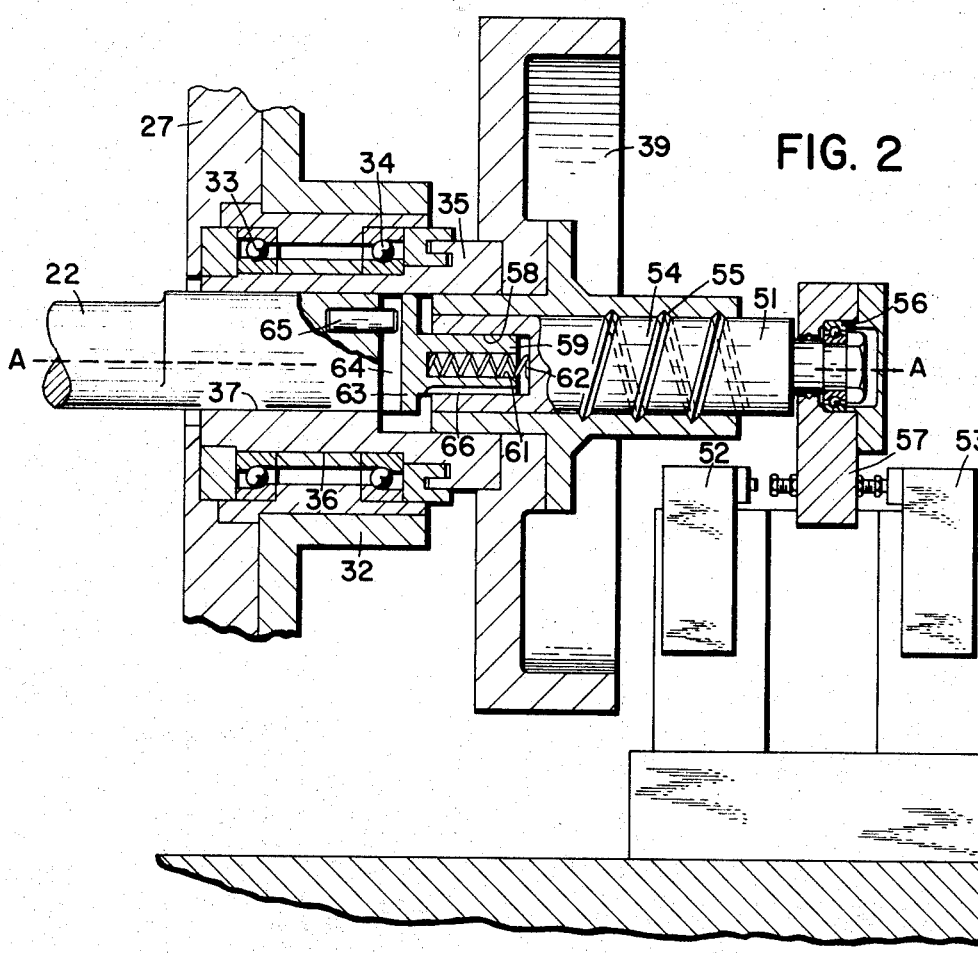
FIG. 2 is a vertical sectional view considerably enlarged of a portion of the machine tool.

Referring now to FIG. 2, it can be seen that the indicator member 51 consists of a first part 54 which is in the nature of a rod which extends generally coaxially of the sleeve 35; that is to say, about the axis A—A. It is mounted in a bore in the pulley 39 and is connected to it by a long-lead thread 55. At its outer end the first part 54 carries a ball bearing 55 on which is mounted a contact member 57 which partakes of the longitudinal motion of the first part 54 but not its rotation. A contact member 57 is in position to engage the switches 52 and 53 on occasion. The inner end of the first part 54 is provided with a short bore 58 in which is slidably mounted a plunger 59. The inner end of the plunger is also provided with a bore 61 carrying a coil spring 62 which biases the spring outwardly of the bore 58. At its outer end the plunger 59 is provided with a head 63 which is provided with a transverse slot 64 adapted to receive a peg 65 which extends axially from the adjacent end of the boring bar 22. A key 66 is operative to keep the plunger 59 from rotating relative to the first part 54 of the indicator member while allowing longitudinal sliding thereof.

The operation of the apparatus will now be readily understood in view of the above description. Assuming that the table 13 is withdrawn to the left in FIG. 1 and the bar 22 is entirely removed from the housing 27, a new unfinished workpice 28 is inserted within the housing 27 and is locked in place in the usual way. Then the cylinder 14 is actuated to push the table 13 toward the housing 27 to introduce the bar 22 into the bore 29 of the workpiece. The motor 24 and the pulley 42 all go along with the table 13 sliding along the shaft 44. The motor 24 operates through the pulley 41 and 42 to rotate the hub 43 as well as the shaft 44. The pulley 47 operates through the pulley 38 to rotate the sleeve 18. Also, the shaft 44 operates through the pulley 48 and the pulley 39 to rotate the sleeve 35, thus the two sleeves 18 and 35 rotate together and carry the bar 22 with them. The bar 22 is located within the sleeve 18 with the tool 23 in its inoperative position, so that the tool 23 is, in effect, rotated around the axis A—A and does not come anywhere near the workpiece 28. Because the sleeves 18 and 35 are rotated together in synchronization, the bores 21 and 37 remain coaxial, so that as the table 13 advances to the right in FIG. 1, the free end of the bar 22 easily introduces itself into the bore 37 and the sleeve 35. Eventually, the pin 35 slides into the slot 64 in the head 63 of the plunger 59. Rotation of the pulley 39, therefore, not only rotates the sleeve 35 but also operates through the first part 54, the plunger 59, and the peg 65 to rotate the free end of the bar 22. Since both ends of the bar 22 are being rotated along with their respective sleeves at the same rate, there is no relative movement between the pulley 39 and the first part 54 of the indicator member, so that the threads 55 do not operate and the contact member 57 stays in its location.

In order to perform the machining operation, it is necessary to turn the shaft 22 180° about the pivot line B—B and this operation is performed by the vane-type motor 25. When this motor operates to move the bar 22 at its left-hand end, there is a differential movement between the right-hand or free end of the bar 22 and the pulley 39. This causes the long-lead thread 55 to feed the first part 54 to the right carrying the contact member 57 with it, so that, eventually, it contacts the switch 53. The switch, therefore, carries an indication to the machine tool controls that the tools 23 are in their operative position. This operative position is shown in the dotted lines and indicated by the reference numeral 23' in FIG. 3. It can be seen, then, that when the sleeve 18 and the bar 22 now revolve together, the tool 23 will engage the workpiece 28 and form a groove 31. Since the vane-type motor 25 takes some time to operate, the tool 23 is fed outwardly relatively slowly and, since the sleeve and bar are rotating at work speed at all times, the cut of the groove 31 takes place during the movement from inoperative to operative position. When the machining operation has been finished, it will be necessary to withdraw the bar 22 from the workpiece in order to permit the removal of the workpiece from the work support or housing 27. Since the tools 23 reside in the grooves 31, it is not possible to withdraw the tool without an accident. Therefore, it is necessary to reverse the positioning of the bar 22 within the sleeve 18 and 35, and this is done by reversing the vane-type motor 25 and operating it through 180° to return the tool 23 to the position shown in FIG. 3. The tools are then out of engagement with the bore 29 or any part of the workpiece 28 and the bar 22 may be withdrawn by the operation of the cylinder 14 on the table 13 to slide the table along the ways 12.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
 (a) a base,
 (b) a sleeve having an outer cylindrical surface and mounted for rotation relative to the base about the axis of the surface, the sleeve having a cylindrical bore whose axis is spaced from and parallel to the said axis of the surface,
 (c) a bar mounted in the bore of the sleeve and having a radially-extending tool mounted on a portion of the bar outside of the bore,
 (d) a first means for rotating the sleeve and the bar together about the axis of the surface,
 (e) a second means for rotating the bar relative to the sleeve about the bore axis to move the tool from an inoperative position to an operative position,
 (f) a third means for indicating whether the tool is in the operative or the inoperative position, and
 (g) an indicator member to which the bar is connected through a long-lead thread arrangement, the bar and the indicator member normally rotating together due to the action of the said first means, the second means being operative only on the bar, so that the differential rotation produces longitudinal movement of the indicator member relative to the bar.

2. A machine tool as recited in claim 1, wherein two spaced limit switches are mounted on the base so that one is actuated by the indicator member as the tool approaches the operative position and the other is actuated by the indicator member as the tool approaches the inoperative position.

3. A machine tool, comprising
 (a) a base,
 (b) a sleeve having an outer cylindrical surface and mounted for rotation relative to the base about the axis of the surface, the sleeve having a cylindrical bore whose axis is spaced from and parallel to the said axis of the surface, (c) a bar mounted in the bore of the sleeve and having a radially-extending tool mounted on a portion of the bar outside of the bore, (d) a first means for rotating the bar relative to the sleeve about the bore axis to move the tool from an inoperative position to an operative position, and (f) a second sleeve having a bore in which the bar is supported at a position substantially spaced in the longitudinal direction from the first-mentioned sleeve, the second sleeve having an outer cylindrical surface which is coaxial to the surface of the first-mentioned sleeve, being mounted for rotation relative to the base about its axis, its bore being coaxial with the corresponding bore of the first-mentioned sleeve, the said first means being operative to drive both sleeves at the same speed.

4. A machine tool as recited in claim 3, wherein the tool is attached to the bar at a location between the two sleeves and wherein the bar is provided with an indentation in which the tool lies, so that the tool does not extend radially outwardly of the imaginary extension of the normal cylindrical surface over the indentation.

5. A machine tool as recited in claim 4, wherein the indentation and the tool are located relatively close to the axis of the outer surface of the sleeve facing in a first direction when the tool is in the inoperative position and they are located relatively far from the axis facing in an angularly-spaced direction when the tool is in the operative position.

6. A machine tool as recited in claim 5, wherein the second sleeve is connected to an indicator member which is connected by a long-lead thread to the bar and wherein a contact member is mounted on the outer end of the indicator member to partake of its longitudinal movement but not its rotation.

7. A machine tool as recited in claim 3, wherein means is provided for moving the first-mentioned sleeve and the bar longitudinally so that the outer end of the bar is removed from the second sleeve while both sleeves continue to be rotated by the said first means and their bores remain coaxial.

References Cited

UNITED STATES PATENTS

| | | | |
|---|---|---|---|
| 1,996,842 | 4/1935 | Stevens | 77—58 |
| 2,519,117 | 8/1950 | Curtis | 77—3 |
| 2,820,376 | 1/1958 | Jannenga et al. | 77—58 |
| 3,386,317 | 6/1968 | Flick et al. | 77—58 |

FOREIGN PATENTS 166,216 1/1965 U.S.S.R.

GERALD A. DOST, Primary Examiner

U.S. Cl. X.R.

77—58